(12) United States Patent
Hofer et al.

(10) Patent No.: US 9,676,023 B2
(45) Date of Patent: Jun. 13, 2017

(54) METHOD FOR PRODUCING A PUNCH RIVET JOIN AND COMPOSITE PART

(71) Applicant: MAGNA STEYR Engineering AG & Co KG, Graz (AT)

(72) Inventors: Bernhard Hofer, Graz (AT); Reinhard Hörmann, Hitzendorf (AT)

(73) Assignee: MAGNA STEYR Engineering AG & Co KG, Graz (AT)

( * ) Notice: Subject to any disclaimer, the term of this patent is extended or adjusted under 35 U.S.C. 154(b) by 430 days.

(21) Appl. No.: 14/450,248

(22) Filed: Aug. 3, 2014

(65) Prior Publication Data

US 2015/0037600 A1 Feb. 5, 2015

(30) Foreign Application Priority Data

Aug. 2, 2013 (EP) ..................................... 13179100

(51) Int. Cl.
| | | |
|---|---|---|
| *B21J 15/02* | (2006.01) | |
| *B32B 7/08* | (2006.01) | |
| *F16B 19/06* | (2006.01) | |
| *F16B 5/04* | (2006.01) | |
| *F16B 19/08* | (2006.01) | |

(52) U.S. Cl.
CPC ............. *B21J 15/02* (2013.01); *B21J 15/025* (2013.01); *B32B 7/08* (2013.01); *F16B 5/04* (2013.01); *F16B 19/06* (2013.01); *F16B 19/086* (2013.01); *B32B 2250/02* (2013.01); *Y10T 29/49943* (2015.01); *Y10T 428/12292* (2015.01); *Y10T 428/12347* (2015.01)

(58) Field of Classification Search
CPC .. F16B 5/01; F16B 5/04; F16B 5/0004; F16B 19/086; B29C 65/609; B29C 66/43441; B29C 66/438; B29C 66/72523; Y10T 428/12375; Y10T 428/12229; Y10T 428/12292; Y10T 29/49943; Y10T 29/49956; B21J 15/025; B21J 15/046; B21J 15/048

See application file for complete search history.

(56) References Cited

U.S. PATENT DOCUMENTS

| | | | | |
|---|---|---|---|---|
| 2,993,573 A | * | 7/1961 | Bloedow | E06B 3/9642 403/241 |
| 3,511,525 A | * | 5/1970 | Friedling et al. | F16B 17/008 29/522.1 |
| 3,837,136 A | * | 9/1974 | Graham | F16B 5/00 403/230 |

FOREIGN PATENT DOCUMENTS

DE 19905528 A1 8/2000

\* cited by examiner

*Primary Examiner* — Adam Krupicka
(74) *Attorney, Agent, or Firm* — Jordan IP Law, LLC; Todd A. Vaughn

(57) ABSTRACT

A method for producing a punch-riveted connection between a first component and a second component having a flat cross-section, and a composite component that includes the first component and the second component.

18 Claims, 4 Drawing Sheets

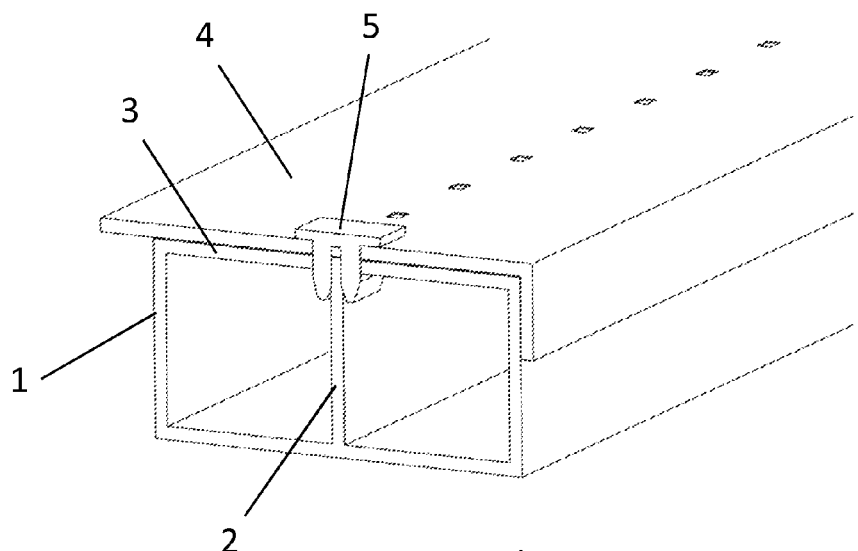
Fig. 7
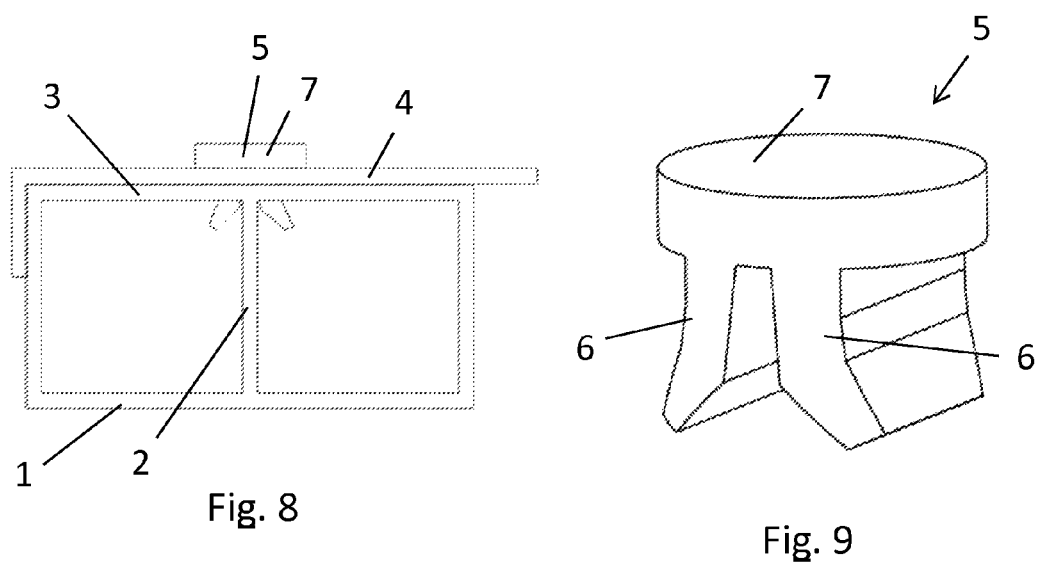
Fig. 8
Fig. 9

METHOD FOR PRODUCING A PUNCH RIVET JOIN AND COMPOSITE PART

CROSS-REFERENCE TO RELATED APPLICATIONS

The present application claims priority 35 U.S.C. §119 to European Patent Publication No. EP 13179100.6 (filed on Aug. 2, 2013), which is hereby incorporated by reference in its entirety.

TECHNICAL FIELD

Embodiments are related to a method for producing a punch-riveted connection between a first component and a second component having a flat cross-section, and a composite component comprising the first component and the second component.

BACKGROUND

Connections of two components by way of punch rivets are known per se. Punch riveting is a riveting method in which it is not necessary to pre-punch the components. Use is made for example of solid rivets or semi-hollow rivets. In punch riveting with a semi-hollow rivet, the rivet is pushed through the first component and deforms the second component, in particular a metal sheet. In the process, the rivet is spread and the second component forms a closing head for the rivet. During the riveting operation, the joint is supported on a die as dolly.

In the punch riveting of a first component having a non-flat cross-section with a second component that is configured in a flat manner, although a punch rivet may be positioned from the side of the component configured in a flat manner, sometimes good accessibility is not available on the first component side and so it is not possible to use a die there.

SUMMARY

In accordance with embodiments, in a method for producing a punch-riveted connection between a first component and a second component having a flat cross-section, the punch-riveted connection may be used in the case of poor accessibility for a die.

In accordance with embodiments, a composite component is provided comprising a first component and a second component having a flat cross-section, the composite component being easy to produce, even in the case of poor accessibility for a die.

In accordance with embodiments, in a method for producing a punch-riveted connection between a first component and a second component having a flat cross-section, the first component has a crosspiece which is oriented substantially normal to a joining surface of the first component, the second component is to rest against the joining surface of the first component, in the region of the crosspiece, on that side of the joining surface that faces away from the crosspiece, punch rivets are set along the crosspiece, from the second component side such that the second component is connected to the first component, and the crosspiece acts as a die, i.e., a dolly, for the punch riveting.

In accordance with embodiments, a crosspiece of one component may be used as a dolly. Rivets may be introduced along the crosspiece into the components to be connected, without it being necessary to use a separate die.

In accordance with embodiments, a composite component comprises a first component and a second component having a flat cross-section, the first component having a crosspiece which is oriented substantially normal to a joining surface of the first component, the second component resting against the joining surface of the first component in the region of the crosspiece on that side of the joining surface that faces away from the crosspiece, and punch rivets set along the crosspiece from the second component side such that the second component is connected to the first component.

Developments of embodiments are specified in the dependent claims, the description and the appended drawings.

In accordance with embodiments, a method for producing a punch-rivet connection comprises at least one of: providing a first component having crosspiece which is oriented normal to a joining surface of the first component, and a second component; resting the second component against the joining surface of the first component; and setting at least one punch rivet in a region of the crosspiece on a side of the joining surface facing away from the crosspiece such that the second component is connected to the first component, wherein the crosspiece acts as a die for the at least punch rivet.

In accordance with embodiments, a method for producing a connection comprises at least one of: providing a pair of components, the first component having a hollow profile and a crosspiece extending through the hollow profile normal to a joining surface of the first component; placing the second component on the joining surface of the first component; identifying the location of the crosspiece on a side of the joining surface facing away from the crosspiece; and connecting the second component to the first component by setting at least one punch rivet at the identified location of the crosspiece and using the crosspiece as a die for the at least punch rivet.

In accordance with embodiments, a composite component comprises at least one of: a first component having crosspiece which is oriented substantially normally to a joining surface of the first component; a second component which rests against the joining surface of the first component; and at least one punch rivet to connect the second component to the first component in a region of the crosspiece and on a side of the joining surface that faces away from the crosspiece.

In accordance with embodiments, the first component may have a hollow profile and the crosspiece an intermediate crosspiece in the hollow profile. In particular, the crosspiece may reach from a boundary surface of the first component, specifically the joining surface, as far as an opposite boundary surface. In particular, the intermediate crosspiece may be embodied as a central crosspiece, e.g., may be arranged substantially centrally between two lateral boundary surfaces of the hollow profile.

In accordance with embodiments, the punch rivets each have two legs oriented on either side of the crosspiece, e.g., in each case one leg to the left and one leg to the right of the crosspiece such that the centre line of the crosspiece coincides substantially with the centre line between the legs of the rivet. As a result, the crosspiece may act optimally as a dolly and effect spreading of the rivet.

In accordance with embodiments, the punch rivets may have a non-rotationally symmetrical head, in particular a quadrangular head, in order in particular to simplify or allow the rivet to be positioned in a setting machine. The non-rotationally symmetrical head of the rivets may always be oriented identically with respect to the legs of the rivets. As a result, when setting the rivets, it is clearly visible where the legs are located.

In accordance with embodiments, the ends of the legs of the punch rivets are embodied in a pointed manner, in particular as cutting edges, in order to enhance the ability to cut through the components. In particular, the points may be located in each case on the outside of the legs, with the result that the rivet begins to spread more quickly.

In accordance with embodiments, in the method, the ends of the legs of the punch rivets do not pass through the joining surface of the first component. The connection produced is then tight and holds well as a result of an undercut in the first component.

In accordance with embodiments, in the method, the ends of the legs of the punch rivets pass through the joining surface of the first component.

In accordance with embodiments, the punch rivets are set by a setting machine, in particular in an automated manner. By way of a second setting head or double setting head on the opposite side of each particular crosspiece, it is possible for a further second component to be fastened, for example simultaneously, to the first component. The position of the crosspiece is then configurable in the setting machine, such that the setting machine knows the position and orientation of the crosspiece when setting the punch rivets. The position of the crosspiece may also be marked on the second component, in particular on the outwardly directed surface thereof, such that it is clear from this side where the rivets have to be set. The punch rivets may also be positioned on the second component by way of a template.

In a method in accordance with embodiments, a separate dolly is not necessary on account of the use of the crosspiece as a die. Nevertheless, in accordance with embodiments, a dolly that rests in particular against a boundary surface, located opposite the joining surface, of the first component may be used, however, when setting the rivets, in order to increase dimensional stability.

A composite component in accordance with embodiments comprises a first component and a second component having a flat cross-section, in which the first component has a crosspiece which is oriented substantially normal to a joining surface of the first component, the second component resting against the joining surface of the first component in the region of the crosspiece, on that side of the joining surface that faces away from the crosspiece, and punch rivets set along the crosspiece from the second component side such that the second component is connected to the first component.

In this case, the first component may have a hollow profile and the crosspiece an intermediate crosspiece, in particular a central crosspiece, in the hollow profile.

The first component may also be a hollow profile having a plurality of crosspieces, in particular a plurality of intermediate crosspieces, in which, in accordance with embodiments, the first component may be connected to a second component by way of punch riveting at one, some or all the crosspieces.

The punch rivets may each have two legs which are oriented on either side of the crosspiece.

In accordance with embodiments, the punch rivets may have a non-rotationally symmetrical head, in particular a quadrangular head.

In accordance with embodiments, the ends of the legs of the punch rivets may be embodied in a pointed manner, in particular as cutting edges with points located in each case on the outside.

In accordance with embodiments, it is possible for the ends of the legs of the punch rivets to pass or not to pass through the joining surface of the first component.

DRAWINGS

Embodiments will be illustrated by way of example in the drawings and explained in the description below.

FIG. 7 illustrates a perspective view of a composite component, in accordance with embodiments.

FIG. 8 illustrates a front view of a composite component, in accordance with embodiments.

FIG. 9 illustrates a perspective view of a punch rivet for producing a composite component, in accordance with embodiments.

DESCRIPTION

Figure 1:
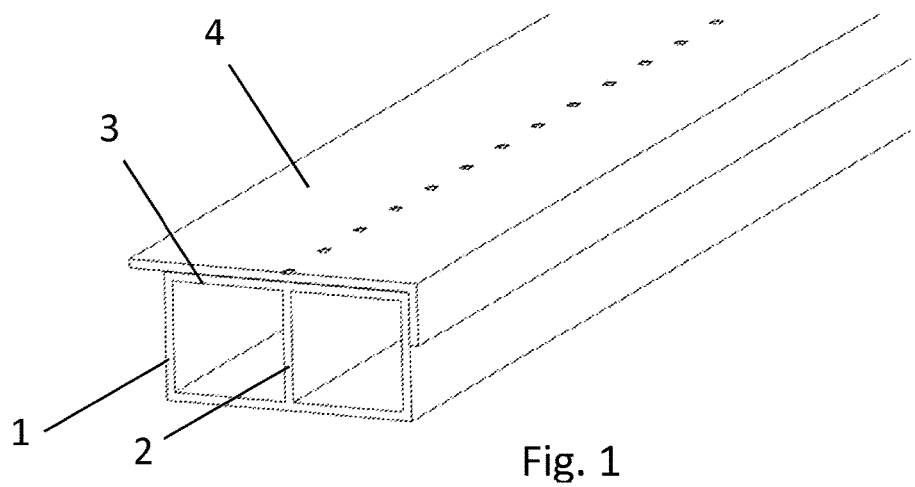
FIG. 1 illustrates a perspective view of a first component and a second component having a flat cross-section for producing a composite component, in accordance with embodiments.

FIG. 1 illustrates a first component 1 and a second component having a flat cross-section 4 that are to be connected together. In this case, the first component 1 is configured as a hollow profile which has a crosspiece 2 that forms a centrally oriented intermediate crosspiece of the hollow profile. The upper surface of the hollow profile forms a joining surface 3 which is joined to the second component 4. Possible positions for setting punch rivets may already be marked on the second component 4, these positions each being arranged precisely spatially above the crosspiece 2 of the first component 1.

Figure 2:
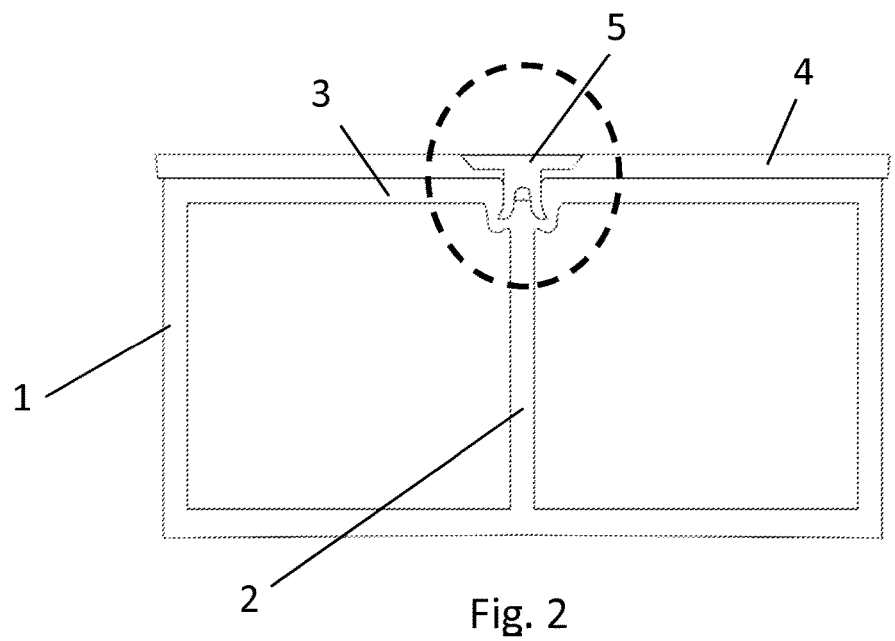
FIG. 2 illustrates sectional view of a composite component, in accordance with embodiments.
Figure 3:
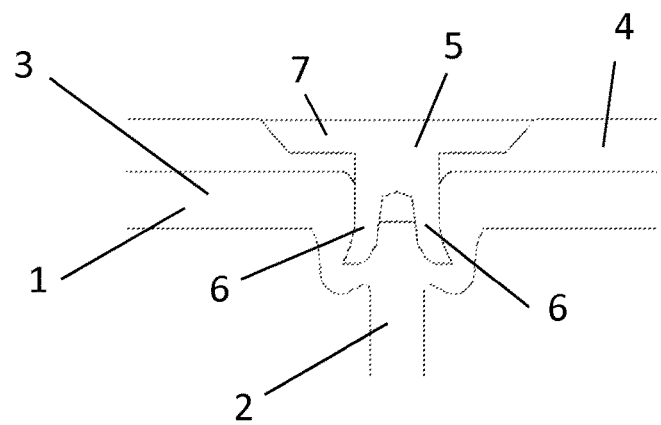
FIG. 3 illustrates a sectional view of the composite component as per the dashed circle of FIG. 2.

FIG. 2 is a schematic sectional illustration of a composite component in accordance with embodiments while FIG. 3 illustrates more precisely the detail which is indicated by way of a dashed circle in FIG. 2. A punch rivet 5 is set, from side of the second component 4, at the area of the crosspiece 2 such that the second component 4 is connected to the first component 1. When setting the punch rivet 5, the crosspiece 2 is to be used as a die. The punch rivet 5 has a pair of spaced apart legs 6 which are positioned substantially to the left and to the right of the crosspiece 2, such that during setting the legs 6 are each deflected to the side by the crosspiece 2. In accordance with embodiments, the ends of the legs 6 of the punch rivet 5 may not pass through the joining surface 3 of the first component 1, but instead, may deform the joining surface 3.

Figure 4:
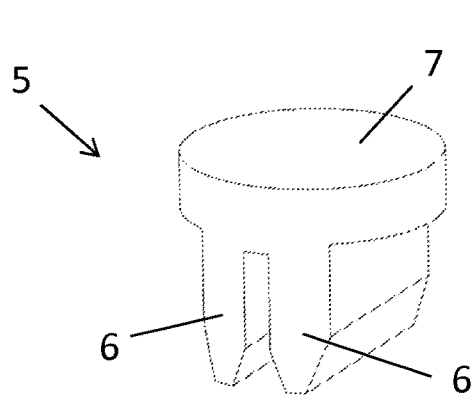
FIG. 4 illustrates a perspective view of a punch rivet for producing a composite component, in accordance with embodiments.
Figure 5:
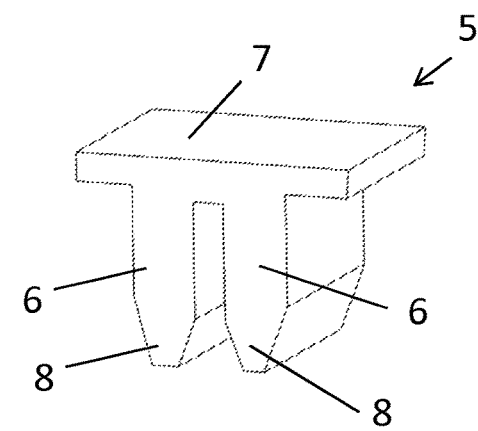
FIG. 5 illustrates a perspective view of a punch rivet for producing a composite component, in accordance with embodiments.
Figure 6:
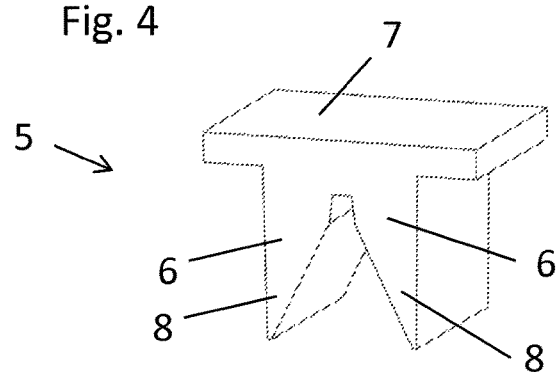
FIG. 6 illustrates a perspective view of a punch rivet for producing a composite component, in accordance with embodiments.

FIGS. 4 to 6 are schematic three-dimensional illustrations of punch rivets 5 for producing a composite component, in accordance with embodiments. The variants illustrated differ primarily by way of the geometric embodiment of the heads 7 and legs 6 of the punch rivets 5.

The respective punch rivets 5 illustrated in FIGS. 4 and 5 each have centrally pointed legs 6. The head 7 illustrated in FIG. 4 has a generally circular cross-section. The head 7 illustrated in FIG. 5 has a generally rectangular cross-section such that the position of the legs 6 is discernible even from the top side of the punch rivet.

The punch rivet 5 illustrated in FIG. 6 has ends of the legs 6 that each taper to a point towards the outside. The head 7 of the has a generally a rectangular cross-section such that the position of the legs 6 is discernible even from the top side of the punch rivet.

FIG. 9 illustrates a punch rivet 5 corresponding to FIG. 4, but after setting of the punch rivet 5. The legs 6 in this case are bent outwards.

FIG. 7 and FIG. 8 illustrate a composite component in accordance with embodiments, in which a punch rivet 5 is set directly over the crosspiece 2 such that the legs 6 of the punch rivet 5 are positioned on respective sides of the crosspiece 2. Of course, in order to join the components 1, 4, a large number of punch rivets 5 may be set along the crosspiece 2. The head 7 of the punch rivets 5 may also usually terminate approximately flush with the uppermost surface of the second component 4 in a less schematic illustration.

Figure 10:
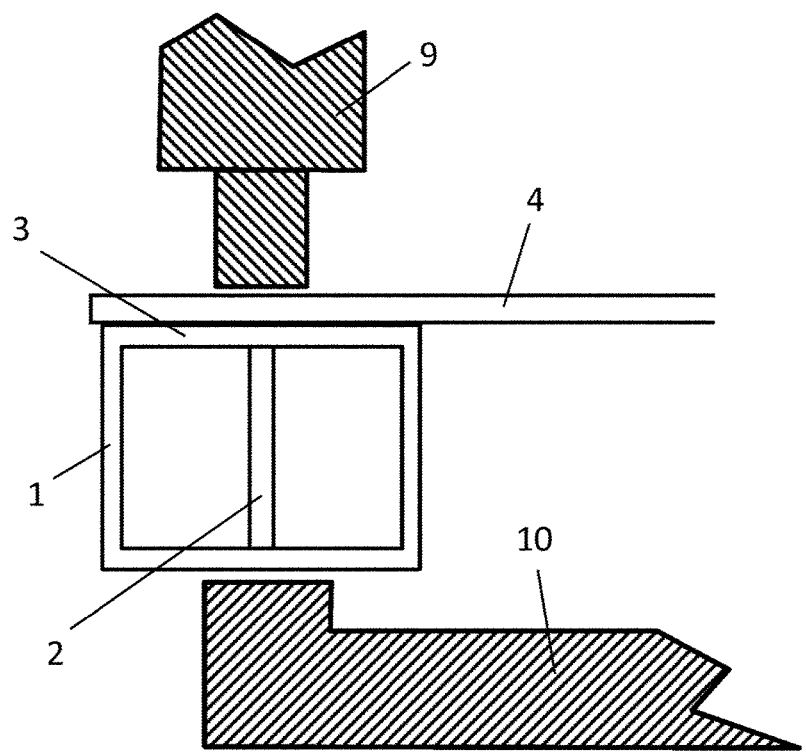
FIG. 10 illustrates a device for producing a punch-riveted connection, in accordance with embodiments.

Finally, FIG. 10 illustrates a device for the production, in accordance with embodiments, of a punch-riveted connection. The device includes a setting machine having a setting head 9 and a dolly 10 which is not positioned as a die for setting the punch rivet on the underside of the joining surface 3, but rather, on the underside of the hollow profile of the first component 1 and serves for better dimensional stability during production. The first component 1 and the second component 4 are arranged between the dolly 10 and the setting head 9.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 First component
2 Crosspiece
3 Joining surface
4 Second component
5 Punch rivet
6 Leg
7 Head
8 Point
9 Setting head
10 Dolly

What is claimed is:

1. A method for producing a punch-rivet connection, comprising:
providing a first component having crosspiece which is oriented normal to a joining surface of the first component, and a second component;
resting the second component against the joining surface of the first component; and setting at least one punch rivet in a region of the crosspiece on a side of the joining
surface facing away from the crosspiece such that the second component is connected to the first component,
wherein the crosspiece acts as a die for the at least punch rivet.

2. The method of claim 1, wherein the first component comprises a hollow profile and the crosspiece comprises an intermediate crosspiece extending in the hollow profile.

3. The method of claim 1, wherein, during the setting of the at least one punch rivet, each of the at least one punch rivets has a pair of legs that pass through the joining surface to be oriented on respective sides of the crosspiece.

4. The method of claim 1, wherein the at least one punch rivet comprises a quadrangular head.

5. The method of claim 1, wherein distal ends of the legs of the at least one punch rivet come to a point that are directed outwardly.

6. The method of claim 1, wherein, during the setting of the at least one punch rivet, distal ends of the legs of the at least one punch rivet do not pass through the joining surface.

7. The method of claim 1, wherein, during the setting of the at least one punch rivet, ends of the legs of the punch rivets pass through the joining surface of the first component.

8. The method of claim 1, wherein the punch rivets are set by a setting machine.

9. The method of claim 8, wherein a location of the crosspiece is identified via the setting machine.

10. The method of claim 1, wherein a position of the crosspiece is marked on the second component.

11. The method of claim 1, wherein the at least one punch rivet is positioned on the second component by way of a template.

12. A method for producing a connection, comprising:
providing a pair of components, the first component having a hollow profile and a crosspiece extending through the hollow profile normal to a joining surface of the first component;
placing the second component on the joining surface of the first component;
identifying the location of the crosspiece on a side of the joining surface facing away from the crosspiece; and
connecting the second component to the first component by setting at least one punch rivet at the identified location of the crosspiece and using the crosspiece as a die for at least one punch rivet.

13. A composite component comprising:
a first component having crosspiece which is oriented substantially normally to a joining surface of the first component;
a second component which rests against the joining surface of the first component; and
at least one punch rivet to connect the second component to the first component in a region of the crosspiece and on a side of the joining surface that faces away from the crosspiece, wherein the first component comprises a hollow profile and the crosspiece comprises an intermediate crosspiece extending in the hollow profile.

14. The composite component of claim 13, wherein each of the at least one punch rivets has a pair of legs such that pass through the joining surface to be oriented on respective sides of the crosspiece.

15. The composite component of claim 13, wherein the at least one punch rivet comprises a quadrangular head.

16. The composite component of claim 13, wherein distal ends of the legs of the at least one punch rivet come to a point that are directed outwardly.

17. The composite component of claim 13, wherein distal ends of the legs of the at least one punch rivet do not pass through the joining surface.

18. The composite component of claim 13, wherein distal ends of the legs of the at least one punch rivet pass through the joining surface.

* * * * *